US 7,694,997 B2

(12) United States Patent
Burghardt et al.

(10) Patent No.: US 7,694,997 B2
(45) Date of Patent: Apr. 13, 2010

(54) AIR BAG MODULE

(75) Inventors: Wilfried Burghardt, Macomb, MI (US);
Jayanthi Bala Subramanyam, Sterling Heights, MI (US); Sean P. Mullady, Leonard, MI (US)

(73) Assignee: TRW Vehicle Safety Sysyems Inc., Washington, MI (US)

( * ) Notice: Subject to any disclaimer, the term of this patent is extended or adjusted under 35 U.S.C. 154(b) by 764 days.

(21) Appl. No.: 11/442,893

(22) Filed: May 30, 2006

(65) Prior Publication Data

US 2007/0278772 A1  Dec. 6, 2007

(51) Int. Cl.
*B60R 21/20* (2006.01)
*B60R 21/203* (2006.01)

(52) U.S. Cl. ................. 280/728.2; 280/728.1; 280/731; 280/743.1

(58) Field of Classification Search .............. 280/728.1, 280/728.2, 731, 743.1
See application file for complete search history.

(56) References Cited

U.S. PATENT DOCUMENTS

| | | | | |
|---|---|---|---|---|
| 2,715,423 | A | * | 8/1955 | Picanol .................... 139/188 R |
| 4,203,346 | A | * | 5/1980 | Hall et al. ...................... 411/34 |
| 4,303,052 | A | * | 12/1981 | Manfredo et al. ........... 123/563 |
| 4,415,149 | A | * | 11/1983 | Rees .......................... 269/88 |
| 4,785,144 | A |  | 11/1988 | Fosnaugh et al. |
| 5,087,069 | A |  | 2/1992 | Corbett et al. |
| 5,284,359 | A |  | 2/1994 | Baba |
| 5,312,129 | A |  | 5/1994 | Ogawa |
| 5,333,897 | A |  | 8/1994 | Landis et al. |
| 5,350,190 | A | * | 9/1994 | Szigethy .................. 280/728.2 |
| 5,354,093 | A |  | 10/1994 | Schenck et al. |
| 5,380,037 | A |  | 1/1995 | Worrell et al. |
| 5,388,858 | A |  | 2/1995 | Cuevas |
| 5,456,488 | A |  | 10/1995 | Bauer |
| 5,470,101 | A | * | 11/1995 | Ennis ....................... 280/728.2 |
| 5,569,893 | A | * | 10/1996 | Seymour ................. 200/61.54 |

(Continued)

FOREIGN PATENT DOCUMENTS

GB          2270882          3/1994

(Continued)

*Primary Examiner*—Paul N. Dickson
*Assistant Examiner*—Barry Gooden, Jr.
(74) *Attorney, Agent, or Firm*—Tarolli, Sundheim, Covell & Tummino LLP

(57) ABSTRACT

An apparatus (10) helps protect an occupant (14) of a vehicle (12). The apparatus (10) includes an inflatable vehicle occupant protection device (22) inflatable between a steering wheel (30) of the vehicle (12) and the vehicle occupant (14). A housing (26) helps support the protection device (22) on the steering wheel (30). A cover (40) helps conceal the protection device (22) in a stored condition on the steering wheel (30). The housing (40) includes a retainer element (132) that extends from a side wall (124) of the housing. The retainer element (132) includes a base portion (232) and a head portion (234). The cover (40) includes a retainer aperture (230) through which the head portion (234) is extendable to help secure the cover to the housing (26). The head portion (234) has a dimension that is greater than a diameter of the retainer aperture (230). The cover (40) is configured to deform elastically to enlarge the retainer aperture (230) to fit over the head portion (234) and thereafter return to its non-deformed condition to form an interference that helps retain the cover on the retainer element (132).

17 Claims, 10 Drawing Sheets

U.S. PATENT DOCUMENTS

| | | | |
|---|---|---|---|
| 5,593,177 A * | 1/1997 | Ricks | 280/731 |
| 5,829,777 A | 11/1998 | Sakurai et al. | |
| 6,050,597 A * | 4/2000 | Coleman | 280/731 |
| 6,062,592 A * | 5/2000 | Sakurai et al. | 280/728.2 |
| 6,622,829 B2 * | 9/2003 | Oliver et al. | 188/303 |
| 6,688,637 B2 * | 2/2004 | Igawa et al. | 280/728.2 |
| 6,752,415 B2 | 6/2004 | Nelson | |
| 6,942,244 B2 | 9/2005 | Roychoudhury | |
| 7,073,817 B2 * | 7/2006 | Rogers et al. | 280/728.2 |
| 7,234,724 B1 * | 6/2007 | Cowelchuk et al. | 280/728.2 |
| 2004/0262889 A1 | 12/2004 | Roychoudhury | |
| 2005/0082794 A1 * | 4/2005 | Geyer et al. | 280/728.2 |
| 2006/0175816 A1 * | 8/2006 | Spencer et al. | 280/731 |
| 2006/0208470 A1 * | 9/2006 | Tsujimoto et al. | 280/731 |

FOREIGN PATENT DOCUMENTS

| | | |
|---|---|---|
| JP | 1-160756 | 6/1989 |

* cited by examiner

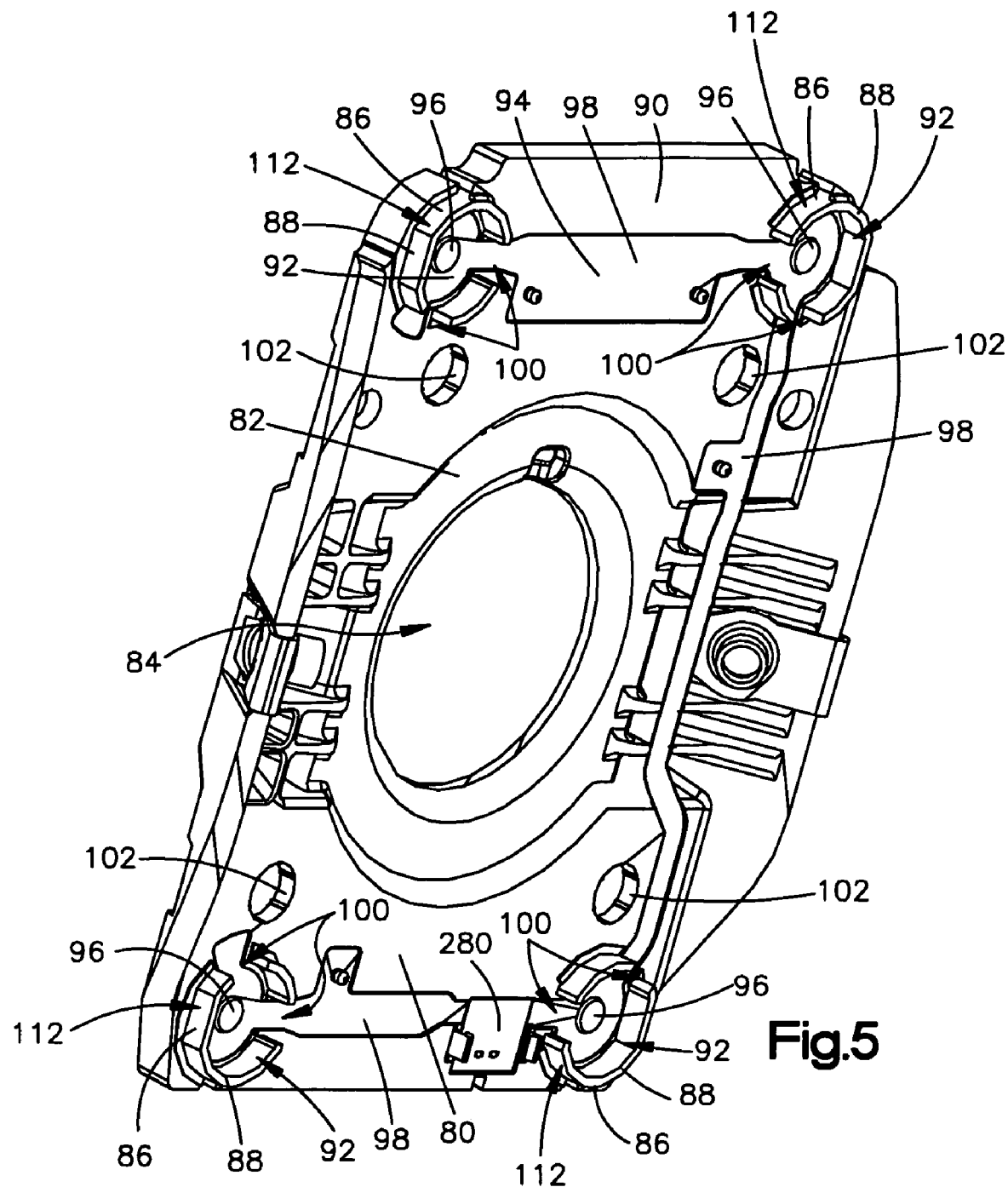

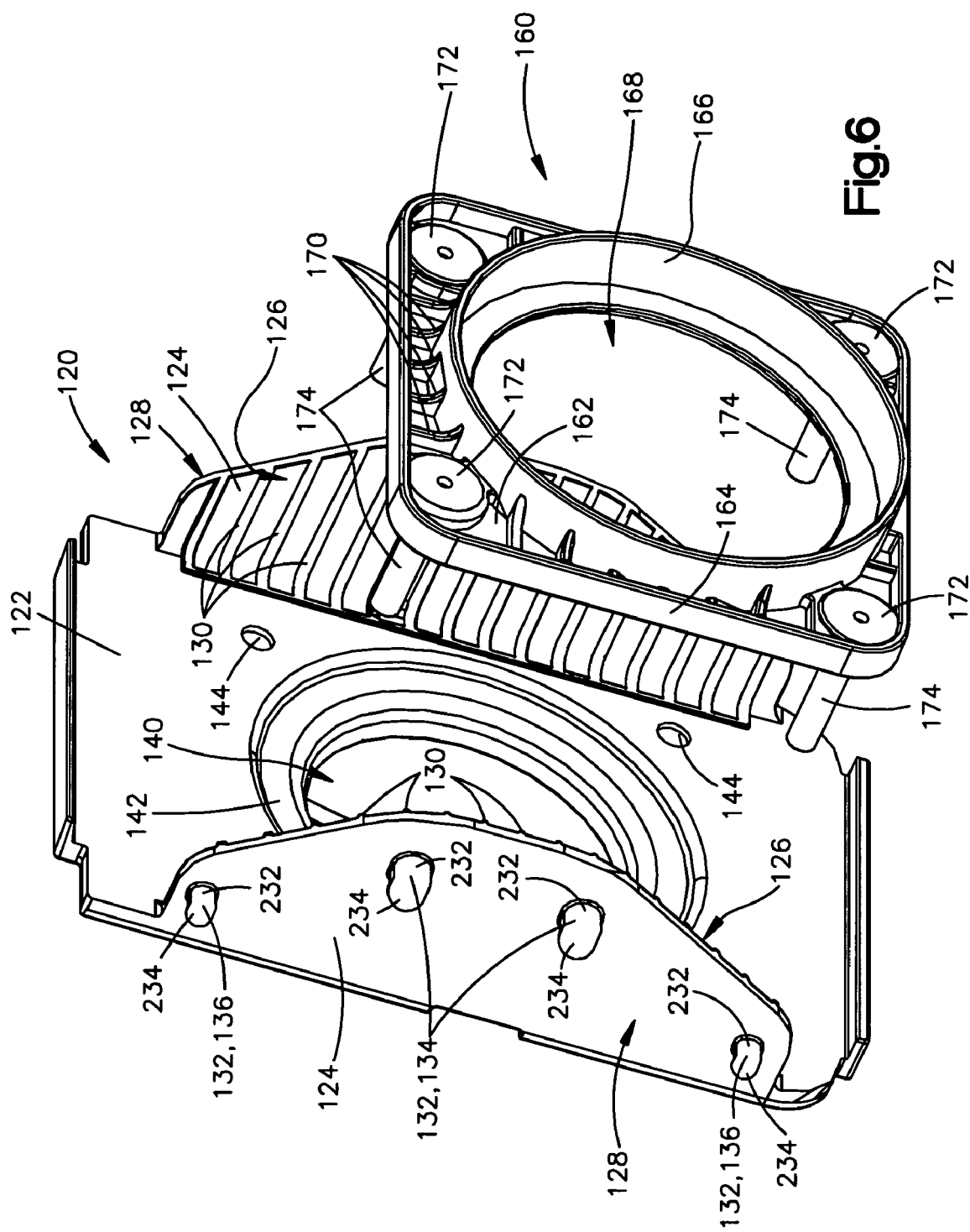

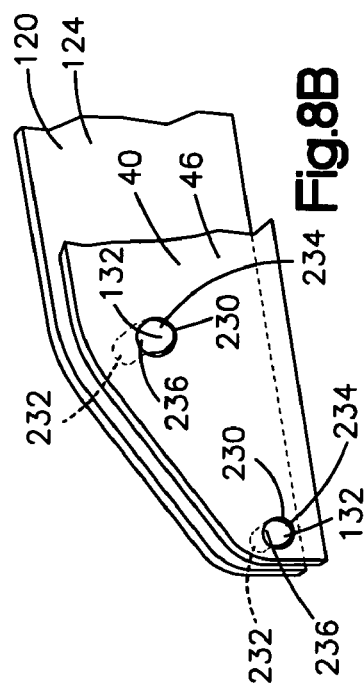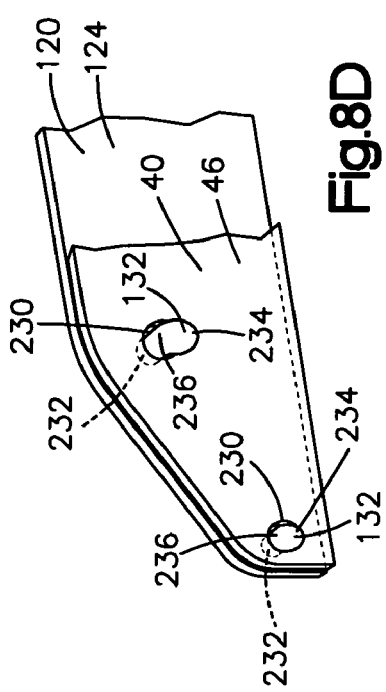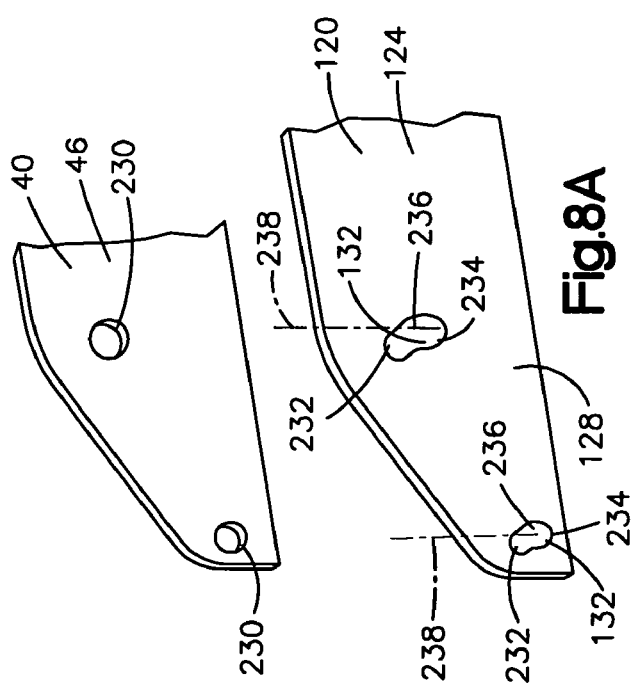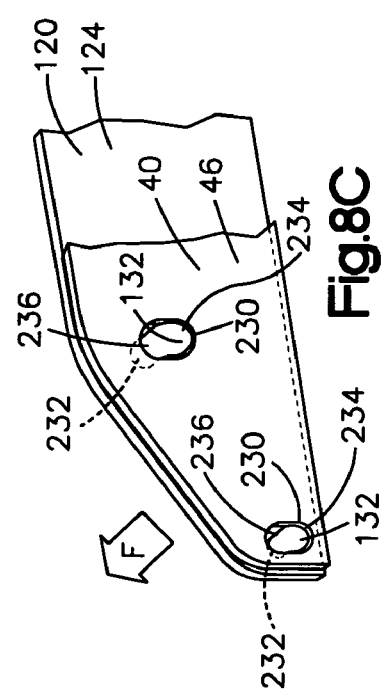

AIR BAG MODULE

BACKGROUND OF THE INVENTION

The present invention relates to an apparatus for helping to protect an occupant of a vehicle upon the occurrence of an event, such as a vehicle collision. In particular, the present invention relates to a steering wheel mounted air bag module.

DESCRIPTION OF RELATED ART

It is known to provide an apparatus that is inflatable to help protect a vehicle occupant upon the occurrence of an event, such as a vehicle collision. One particular apparatus is a driver side air bag module mounted on a vehicle steering wheel. The driver side air bag module includes an air bag that is inflatable to a deployed position between the vehicle steering wheel and a driver side vehicle occupant. The air bag has a stored condition in which the air bag is deflated and concealed by a cover of the air bag module.

SUMMARY OF THE INVENTION

The present invention relates to an apparatus for helping to protect an occupant of a vehicle. The apparatus includes an inflatable vehicle occupant protection device inflatable between a steering wheel of the vehicle and the vehicle occupant. A housing helps support the protection device on the steering wheel. A cover helps conceal the protection device in a stored condition on the steering wheel. The housing includes a retainer element that extends from a side wall of the housing. The retainer element includes a base portion and a head portion. The cover includes a retainer aperture through which the head portion is extendable to help secure the cover to the housing. The head portion has a dimension that is greater than a diameter of the retainer aperture. The cover is configured to deform elastically to enlarge the aperture to fit over the head portion and thereafter return to its non-deformed condition to form an interference that helps retain the cover on the retainer element.

The present invention also relates to an apparatus for helping to protect an occupant of a vehicle. The apparatus includes an inflatable vehicle occupant protection device inflatable between a steering wheel of the vehicle and the vehicle occupant. The base plate is connectable with the vehicle steering wheel. The protection device is secured to a reaction plate. A shoulder nut connects the base plate with the reaction plate and permits the reaction plate to move relative to the base plate.

The present invention further relates to an apparatus for helping to protect an occupant of a vehicle. The apparatus includes an inflatable vehicle occupant protection device inflatable between a steering wheel of the vehicle and the vehicle occupant. A base plate is connectable with the vehicle steering wheel. A reaction plate is connected to the base plate. The protection device is secured to the reaction plate. A horn circuit is supported on the base plate. The base plate has a one piece molded construction and includes a connector portion that defines a space in which one or more electrical connector pins of the horn circuit are disposed. The connector portion is configured to receive a mating connector member in the space to form an electrical connection between the horn circuit and a vehicle mounted circuit.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 4-6 are perspective views of different portions of the air bag module of FIG. 2;

FIGS. 8A-8D are schematic views illustrating the assembly of portions of the air bag module of FIG. 2.

DETAILED DESCRIPTION OF THE INVENTION

Figure 1:
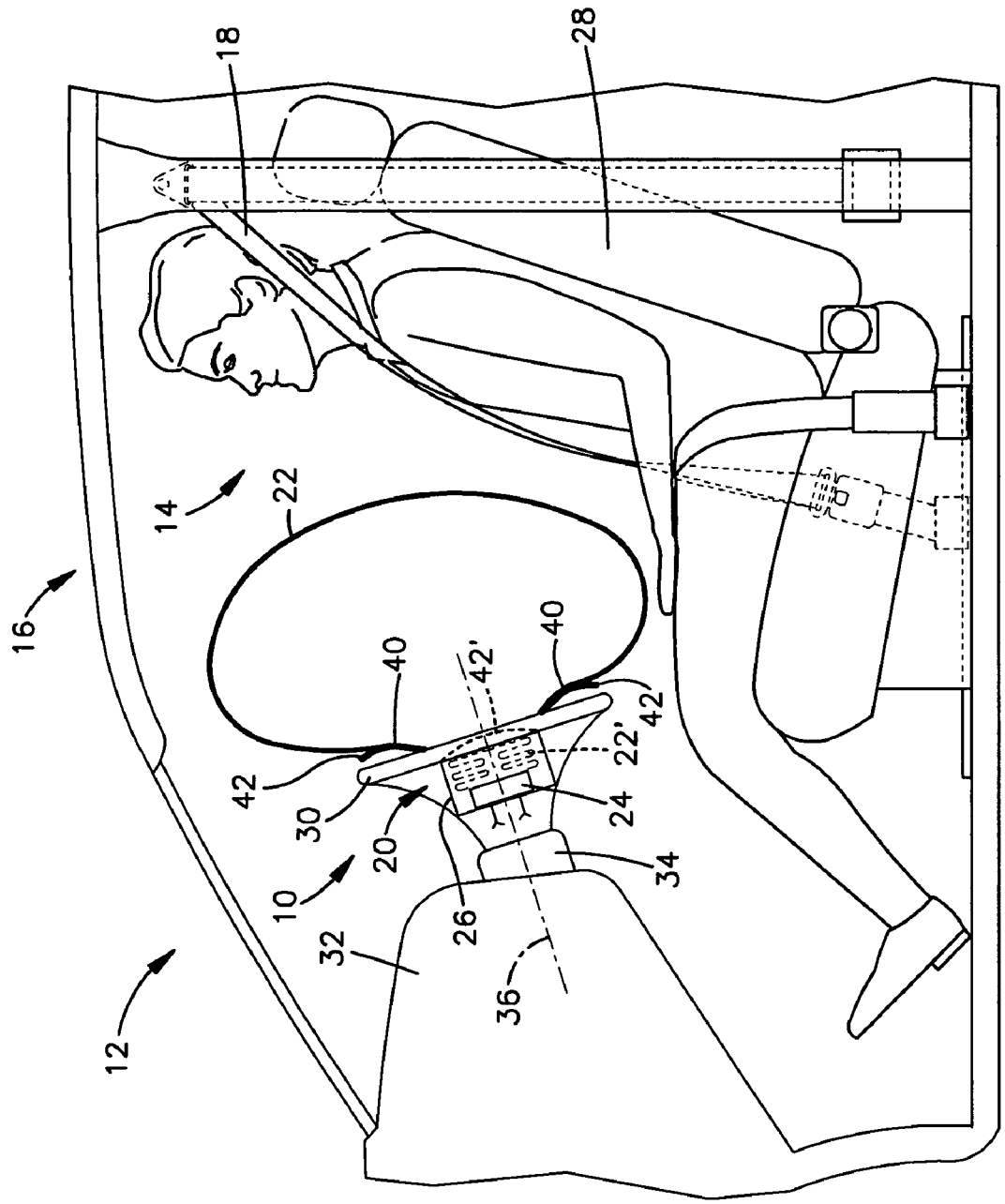
FIG. 1 is a schematic illustration of an apparatus for helping to protect an occupant of a vehicle, according to the present invention.

The present invention relates to an apparatus 10 for helping to protect an occupant 14 of a vehicle 12. Referring to FIG. 1, the vehicle occupant protection apparatus 10 comprises an air bag module 20. The air bag module 20 of FIG. 1 is a driver front air bag module configured to be mounted on a steering wheel 30 on a driver side 16 of the vehicle 12. The vehicle 12 also includes a seatbelt 18 for helping to restrain the occupant 14 in a vehicle seat 28.

The air bag module 20 includes an air bag 22, an inflation fluid source 24, such as an inflator, and a structure 26, such as a housing, for supporting the air bag 22 and inflator 24 in the vehicle 12. The air bag has a stored condition, indicated generally in dashed lines at 22', in which the air bag is deflated, folded, and stored in the housing 26. The housing 26 may include a cover 40 that helps conceal the air bag 22 while in the stored condition.

The inflator 24 is actuatable to inflate the air bag from the stored condition to a deployed condition illustrated generally in solid lines at 22. When the inflator 24 is actuated, flap portions 42 of the cover 40 move from a closed condition helping to conceal the air bag 22 in the housing 26 to an open condition allowing the air bag to inflate and deploy from the housing. The closed condition of the flap portion 42 is illustrated in dashed lines at 42', and the open condition of the flap portion is illustrated in solid lines at 42.

The air bag 22 inflates and deploys in a direction away from the steering wheel 30 and generally parallel to a steering axis 36 of the vehicle 12. In the deployed condition, the air bag 22 is positioned between the occupant 14 and the steering wheel 30 and between the occupant and an instrument panel 32 on the driver side 16 of the vehicle 12. The air bag 22, when in the deployed condition, helps absorb the forces of impacts with the air bag and helps distribute the impact forces throughout the air bag.

Figure 2:
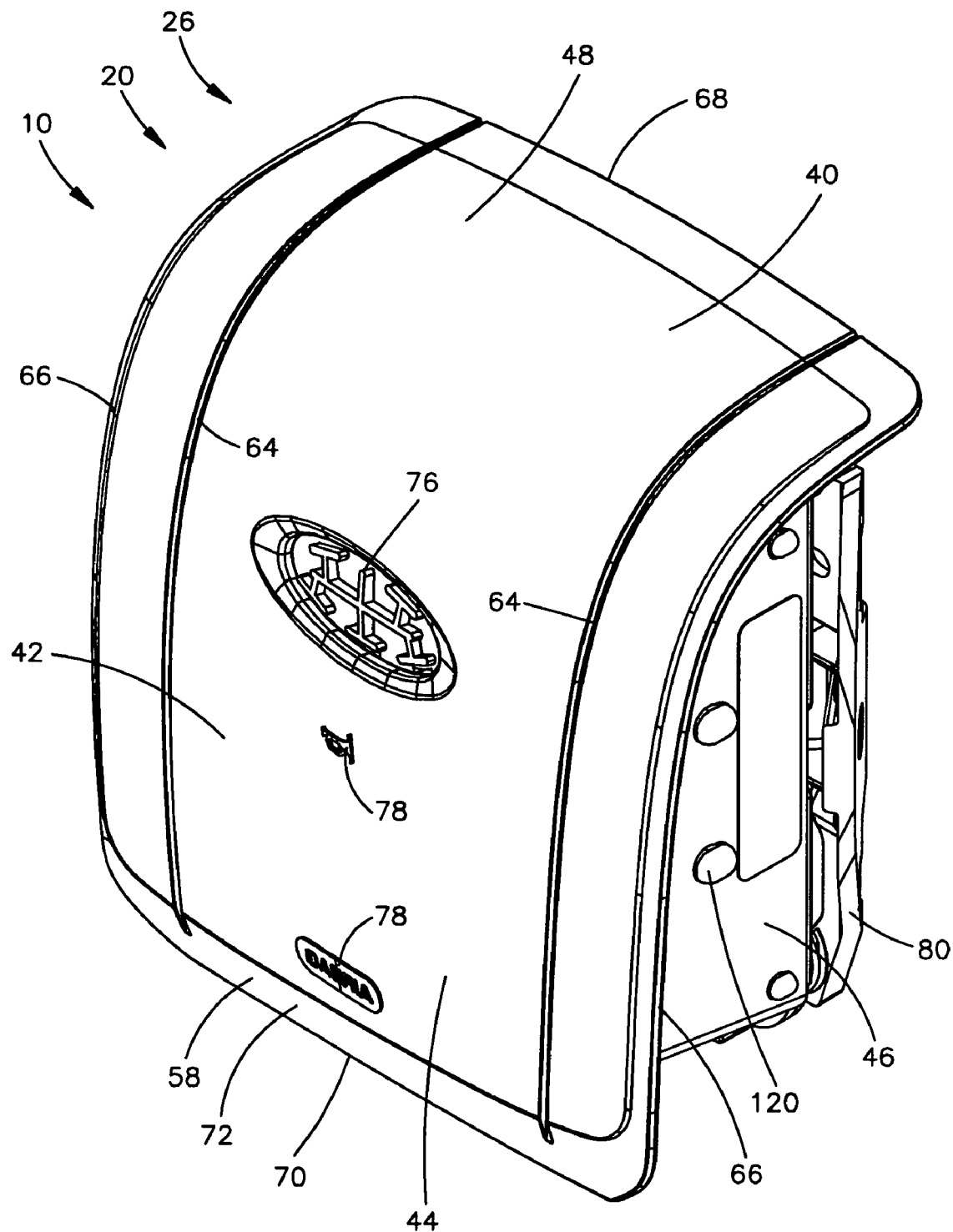
FIG. 2 is a perspective view of an air bag module portion of the apparatus of FIG. 1.
Figure 3:
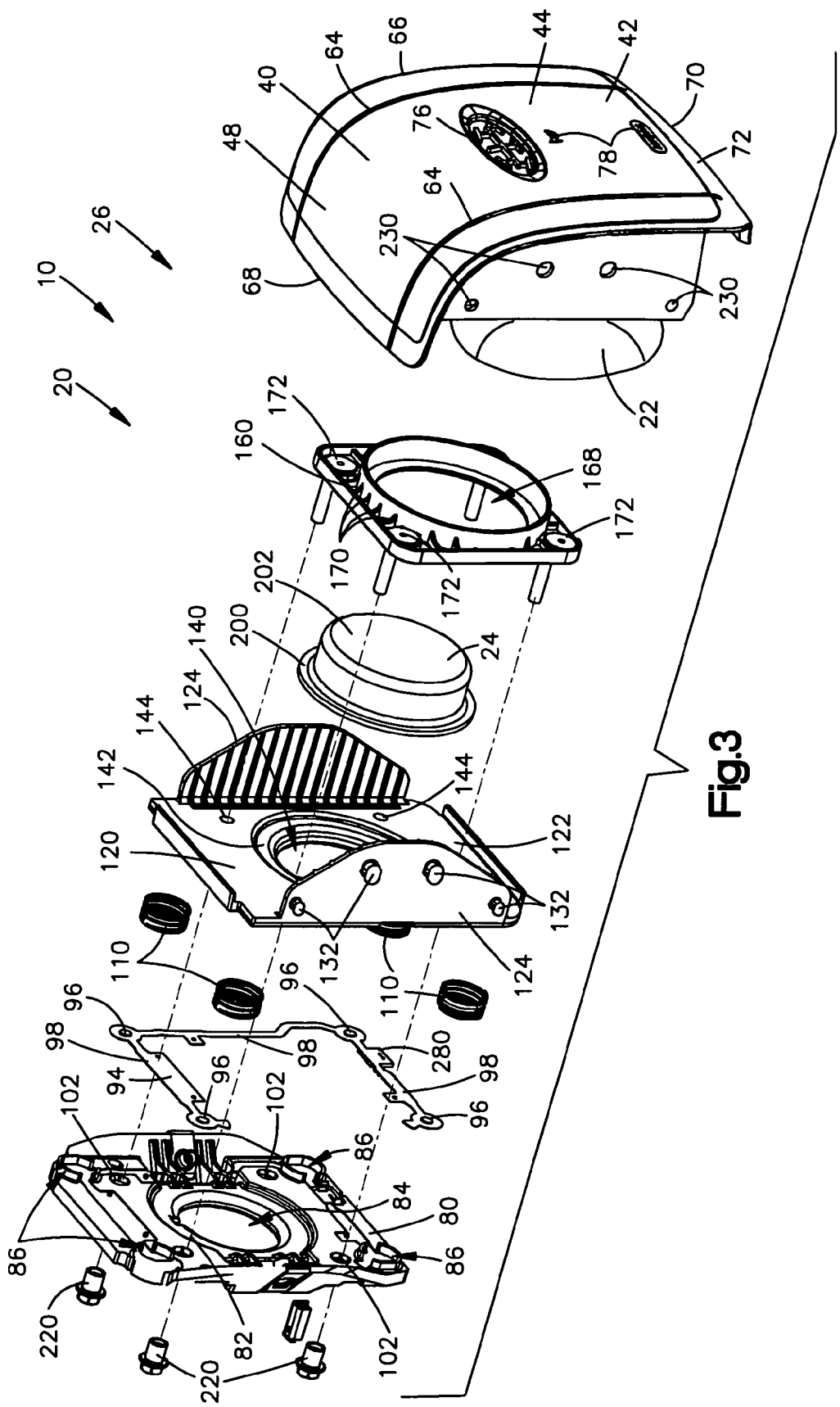
FIG. 3 is an exploded perspective view of the air bag module of FIG. 2.

The air bag module 20 is shown in greater detail in FIGS. 2 and 3. Referring to FIGS. 2 and 3, in addition to the air bag 22, inflator 24, and cover 40, the air bag module 20 includes a base plate 80, a reaction plate 120, and a retainer 160. The housing 26 may include or be defined by any combination of the cover 40, base plate 80, reaction plate 120, and retainer 160.

Figure 4:
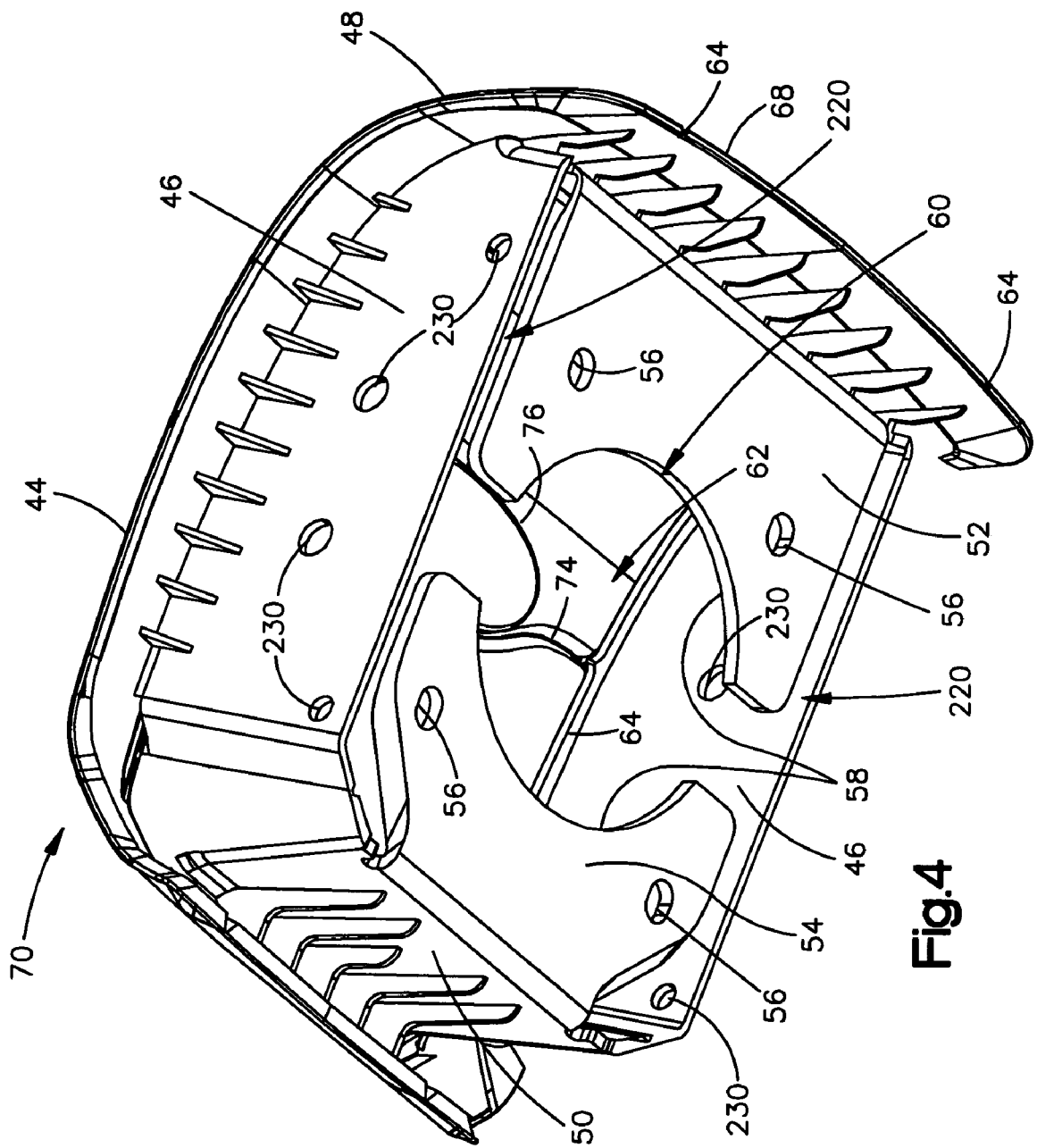

Referring to FIGS. 2-4, the cover 40 may have any desired configuration depending, for example, on factors, such as the configuration of the vehicle 12 (e.g., the steering wheel 30—see FIG. 1), the functional characteristics required from the cover, and the desired aesthetic appearance of the air bag module 20. In the illustrated embodiment, the cover 40 is molded as a single piece of material, such as an injection molded polymer or plastic material.

The cover 40 has a front wall portion 44 and opposite side wall portions 46. The front wall portion 44 has a generally curved or contoured configuration that forms a first end wall portion 48 that extends between the side wall portions 46. A second end wall portion 50 (FIG. 4), opposite the first end wall portion 48, also extends between the side wall portions 46. First and second rear wall portions 52 and 54 extend transversely (e.g., perpendicularly) inward toward each other from terminal ends of the first and second end walls 48 and 50, respectively. Each of the rear wall portions 52 and 54 includes fastener receiving apertures 56.

Each of the rear wall portions 52 and 54 also includes a terminal edge portion 58 that has a generally semi-circular or semi-cylindrical configuration. The terminal edge portions 58 help define a central, generally cylindrical rear opening 60 of the cover 40. The front wall portion 44, side wall portions 46, end wall portions 48 and 50, and rear wall portions 52 and 54 help define a space or confinement 62 within the cover 40.

The flap portion 42 comprises a portion of the front wall portion 44 that is partially defined by longitudinal tear seams 64 that extend generally parallel to the side wall portions 46 and to longitudinal edges 66 of the front wall portion. The tear seams 64 intersect an upper edge 68 of the front wall portion 44 and terminate short of a lower edge portion 70 of the front wall portion, thus defining a hinge portion 72 that extends along and adjacent the lower edge portion. A laterally extending tear seam 74 (FIG. 4) extends across the flap portion 42 and intersects the longitudinally extending tear seams 64. The cover 40 may also include a portion 76 for receiving vehicle branding, such as an emblem (not shown) and indicia 78 for identifying a horn switch function of the air bag module 20 and the presence of the concealed air bag 22.

The base plate 80 may have any desired configuration depending on various factors, such as the configuration of the vehicle 12 (e.g., the steering wheel 30) and the functional characteristics required from the cover base plate. In the illustrated embodiment, the base plate 80 is molded as a single piece of material, such as a molded polymer material. The base plate 80 could, however, have an alternative configuration or material construction.

Referring to FIGS. 3 and 5, the base plate 80 has a generally rectangular configuration and includes a generally circular central opening 84. The opening 84 may, for example, receive a lower portion of the inflator 24 or provide access for establishing electrical connections between the inflator 24 and a steering column 34 (see FIG. 1) of the vehicle 12. An annular recess 82 in the base plate 80 circumscribes the opening 84. The base plate 80 also includes four fastener receiving apertures 102 spaced around the central opening 84.

The base plate 80 also includes switch receiving structures 86. In the illustrated embodiment, the base plate 80 also includes four switch receiving structures 86, one being positioned at each of four corner portions of the base plate 80. The base plate 80 could, however, have a different number of switch receiving structures 86, i.e., more or fewer switch receiving structures. Each switch receiving structure 86 includes side wall 88 that projects transversely (e.g., perpendicularly) from an upper surface 90 of the base plate 80. The side walls 88 are generally cylindrical and may include flattened or planar portions spaced about their circumferences. Each side wall 88 defines a switch space 92 bounded by the side walls.

A horn circuit 94 is mounted on the base plate 80. The horn circuit 94 comprises one or more electrically conductive members for delivering electrical current to a vehicle horn (not shown) in a known manner. The horn circuit 94 may have any known construction, such as a printed circuit board. The horn circuit includes switch portions 96 arranged to correspond to the switch receiving structures 86 of the base plate 80. In the illustrated embodiment, the horn circuit 94 includes four switch portions 96. The switch portions 94 have generally rounded configurations and are electrically connected to each other by three circuit trace portions 98. The side walls 88 of the switch receiving structures 86 include openings 100 through which the circuit trace portions 98 of the horn circuit 94 pass into the switch spaces 92.

The reaction plate 120 may have any desired configuration depending on various factors, such as the configuration of the vehicle 12 and the functional characteristics required from the cover reaction plate. In the illustrated embodiment, the reaction plate 120 is molded as a single piece of material, such as a molded polymer material. The reaction plate 120 could, however, have an alternative configuration or material construction.

Referring to FIGS. 3 and 6, the reaction plate 120 includes a generally rectangular base portion 122 and side wall portions 124 that extend transversely (e.g., perpendicularly) from opposite longitudinal edges of the base portion. Each of the side wall portions 124 has a generally trapezoidal configuration and an inner surface 126 and an opposite outer surface 128. The inner surfaces 126 of the side wall portions 124 are presented facing each other and may include reinforcing ribs 130 that help strengthen, reinforce, or otherwise improve the structural integrity of the side wall portions 124 and the reaction plate 120.

The outer surfaces 128 of the side wall portions 124 include a plurality of retainer elements 132 for helping to secure the cover 40 to the side wall portions 124 of the reaction plate 120. In the illustrated embodiment, four retainer elements 132 project from each outer surface 128. Those skilled in the art, however, will appreciate that the side wall portions 124 may include any number of retainer elements 132.

The retainer elements 132 share the same general form. As shown in FIG. 6, two of the retainer elements 132 (identified at 134) have a first or large size relative to the remaining elements (identified at 136), which have a second or small size. The large retainer elements 134 and small retainer elements 136 are shaped and proportioned in a similar or identical manner. In an alternative configuration, the retainer elements 132 could be identically shaped and sized.

The reaction plate 120 also includes a central cylindrical opening 140 that extends through the base portion 122. A concentric annular recess 142 circumscribes the opening 140. The opening 140 and recess 142 are sized and configured to receive and help support the inflator 24 (see FIG. 2), as described below. The reaction plate 120 further includes four fastener receiving apertures 144 (two of which are visible in FIGS. 3 and 6) that are spaced around the central opening 140.

The reaction plate 120 further includes spring receiving structures 150 (see FIGS. 7A and 7B) positioned adjacent or near the four corner portions of the base portion 122. The spring receiving structures 150 comprise generally cylindrical side walls 152 that extend transversely (e.g., perpendicularly) from the base portion 122. A switch actuator member 154 is positioned centrally in each spring receiving structure 150 and extends transversely (e.g. perpendicularly) from the base portion 122. Each switch actuator member 154 projects axially beyond a terminal end of the side wall 152 of its respective spring receiving structure 150.

The retainer 160 may have any desired configuration suited to perform the functions described herein. In the illustrated embodiment, the retainer 160 is molded as a single piece of material, such as a molded polymer or plastic material. The retainer 160 could, however, have an alternative configuration or material construction, such as a stamped metal construction.

Referring to FIGS. 3 and 6, the retainer 160 has a generally rectangular configuration and includes a generally rectangular base portion 162. An outer side wall portion 164 extends transversely (e.g., perpendicularly) from the base portion 162 and along the rectangular outer periphery of the retainer 160. A central, cylindrical inner side wall portion 166 extends transversely (e.g., perpendicularly) from the base portion 162 and helps define a central cylindrical opening 168 that extends through the retainer 160. The opening 168 is sized and configured to receive and help support the inflator 24 (see FIG. 3), as described below.

The retainer 160 may include ribs 170 that extend from the outer side wall portion 164 and along the base portion 162 to the inner side wall portion 166. The ribs 170 may help strengthen, reinforce, or otherwise improve the structural integrity of the retainer 160. The retainer 160 further includes studs 172 that are positioned at or near corners of the retainer between the inner and outer side wall portions 162 and 164. The studs 172 include threaded shank portions 174 that extend through the base portion 162. In the illustrated embodiment, the studs 172 are secured to the retainer 160 by insert molding the studs with the retainer. The studs 172 could, however, be secured to the retainer 160 by alternative means, such as a press fit.

To assemble the air bag module 20, the components are brought together as indicated generally by the assembly lines of FIG. 3 in order to place the module in the assembled condition. The horn circuit 94 is mounted on the base plate 80 with the switch portions 96 positioned in the switch receiving structures 86 the air bag module 20 includes at least one spring biasing member for biasing the reaction plate 120 against the base plate 80. In the illustrated embodiment, spring biasing members 110, such as a coil springs, are positioned over corresponding switch receiving structures 86 of the base plate 80. At each switch receiving structure 86, the spring 110 is aligned coaxially with the cylindrical switch receiving structure 86 and is maneuvered into a position adjacent or against an outer surface 112 (see FIG. 5) of the side wall 88. The spring 110 has a first end portion 114 (see FIGS. 7A and 7B) that engages the base plate 80 and an opposite second end portion 116 that projects above the upper extent of the switch receiving structure 86.

The reaction plate 120 is maneuvered over the base plate 80 and positioned to align their respective central openings 140 and 84, their respective spring receiving structures 150 and 86, and their respective fastener receiving apertures 144 and 102. As the reaction plate 120 is brought toward the base plate 80, the spring receiving structures 150 enter and engage the second end portions 116 of the springs 110. The springs 110, being coaxially aligned with the cylindrical spring receiving structures 150, become positioned adjacent or against outer surfaces 156 of the side walls 152 of the spring receiving structures. In this assembled condition, the switch actuator members 154 are positioned in the switch space 92 and are axially aligned with the switch portions 96 of the horn circuit 94.

The retainer 160 is then inserted through the mouth portion 204 of the air bag 22 and positioned inside the air bag adjacent the mouth portion. The air bag 22 and retainer 160 are maneuvered such that the shank portions 174 of the studs 172 protrude through corresponding fastener receiving apertures 206 of the air bag. The air bag 22 is folded and the assemblage of the air bag and retainer 160 is positioned in the confinement 62 of the cover 40. The retainer 160 is maneuvered such that the shank portions 174 extend through the fastener receiving apertures 56 in the rear wall portions 52 and 54 of the cover 40.

Figure 7A:
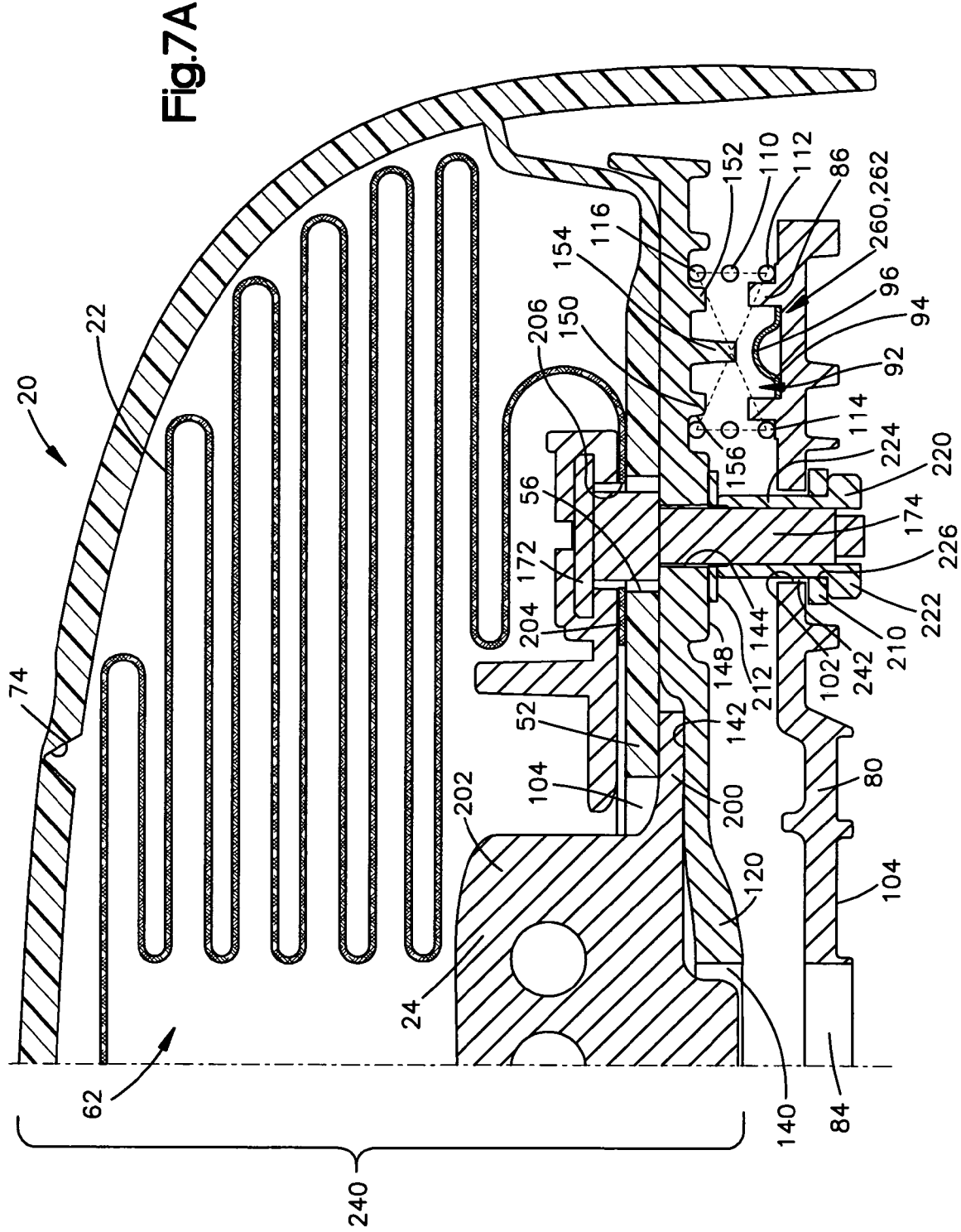
FIGS. 7A and 7B are sectional views illustrating a portion of the air bag module of FIG. 2 in different positions.
Figure 7B:
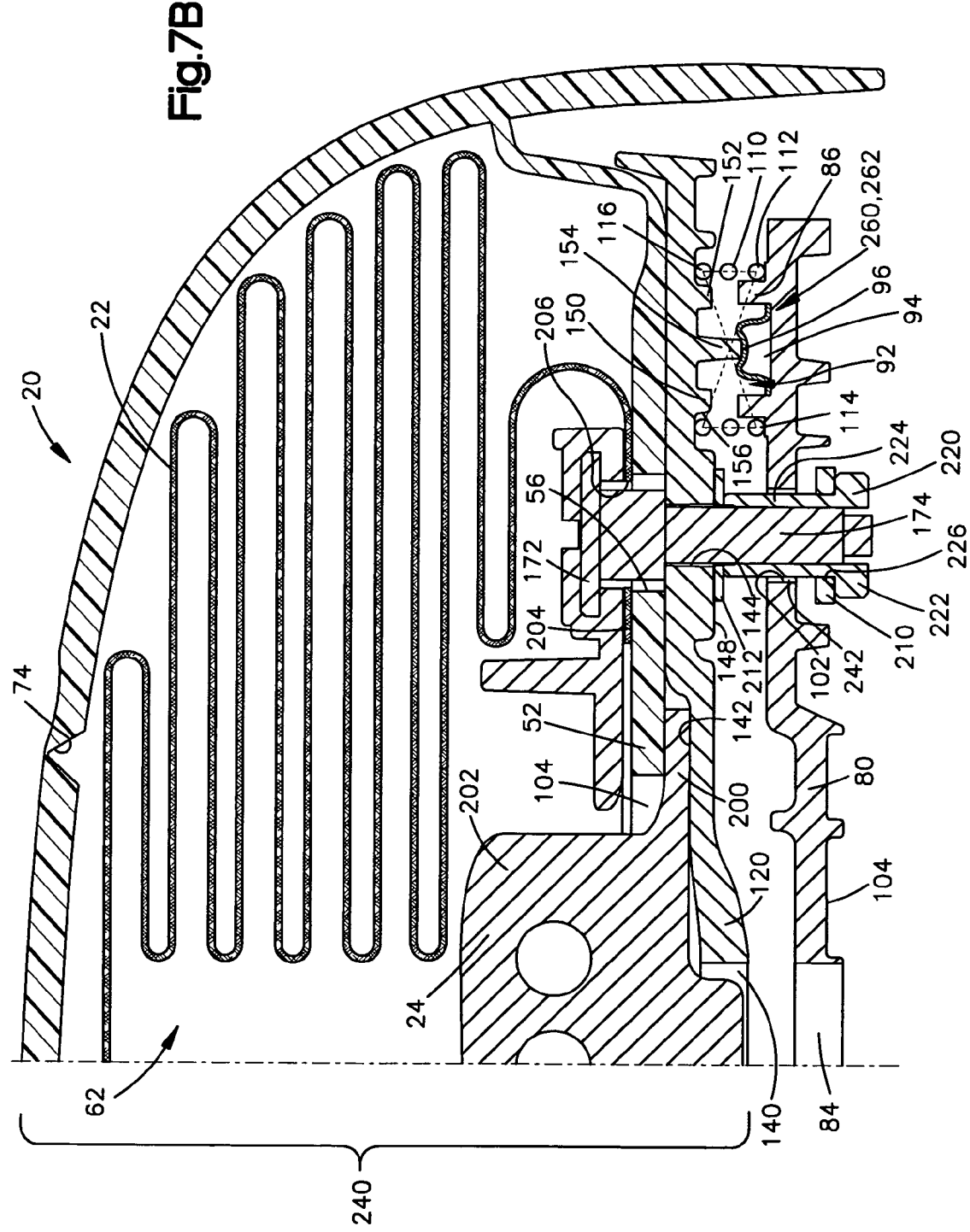

The inflator 24 is positioned on the reaction plate 120 such that an annular flange portion 200 of the inflator is seated in the annular recess 142, thus centering the body portion 202 of the inflator in the central opening 140. The assemblage of the air bag 22, cover 40, and retainer 160 is then positioned on the assemblage of the base plate 80, reaction plate 120, and inflator 24 with the mouth portion 204 of the air bag and the opening 60 of the cover fitting around the body portion 202 of the inflator. As shown in FIGS. 7A and 7B, the shank portions 174 of the studs 172 are maneuvered to extend through the aligned apertures 102 and 144.

As this occurs, the side walls 124 (see FIG. 3) of the reaction plate 120 are maneuvered through respective longitudinal spaces or slots 220 (FIG. 4) in the cover 40 and into the confinement 62. The slots 220 are defined between the side walls 46 and the rear walls 52 and 54 of the cover 40.

According to the present invention, the side wall portions 46 of the cover 40 include retainer apertures 230 spaced and arranged to cooperate with the retainer elements 132 on the outer surfaces 128 of the side wall portions 124 to help secure the cover 40 to the reaction plate 120 and to the air bag module 20. FIGS. 8A-8D illustrate retainer elements 132 on one of the side wall portions 124 and a corresponding side wall portion 46 of the cover 40. The side wall portion 46 and retainer elements 132 shown in FIGS. 8A-8D are representative of the other side wall portion and retainer elements not shown in FIGS. 8A-8D.

Referring to FIGS. 8A-8D, each retainer element 132 includes a base portion 232 and a head portion 234. The base portions 232 have a generally elliptical, cylindrical, or other suitable configuration and project laterally from the outer surface 128 of the side wall portion 124. The head portions 234 have a generally oblong configuration with major or longitudinal axes 238 (FIG. 8A) that extend transversely (e.g., perpendicularly) to the base portions 232 and generally parallel to the side wall portions 124. The head portions 234 give the retainer elements 132 a hook-shaped configuration in which the hook 236 formed by the retainer elements 132 is presented facing away from the front wall portion 44 of the cover 40. As shown in FIGS. 8A-8D, the large retainer elements 132 may have different sizes, while retaining the same or a substantially similar shapes and proportions.

The retainer apertures 230 have a generally circular configuration with a diameter that is smaller than the length of the corresponding retainer elements 132, as measured along the length or major axis 238 of the retainer elements. The retainer elements 132 are installed through the retainer apertures 230 during the assembly of the air bag module 20 described above. When the assemblage of the air bag 14, cover 40, and retainer 160 is positioned on the assemblage of the base plate 80, reaction plate 120, inflator 24, the side walls 124 of the reaction plate 120 are maneuvered through the slots 220 in the cover 40, and the retainer elements 132 approach the retainer apertures 230.

Referring to FIG. 8B, as the side walls 46 and 124 move relative to each other, the retainer apertures 230 are maneuvered over the ends of the head portions 234 and are thus positioned on the hooks 236. Referring to FIG. 8C, a force, indicated generally by the arrow labeled "F", is applied to urge the cover 40 toward the side wall 124 and over the hooks 236 to move relative to each other in parallel planes. The engagement between the retainer apertures 230 and the hooks 236 resists this movement. Because the cover 40 is constructed of an elastic (e.g., polymeric or elastomeric) material, the side wall portions 46 stretch or otherwise deflect, as shown in FIG. 8C. As the side walls 46 stretch or deflect, the retainer apertures deform elastically and the side wall portions 46 of the cover 40 move or "snap" onto the retainer elements 132. Consequently, the hooks 236, specifically the base portions 232, extend through the retainer apertures 230 with the head portions 234 being positioned against the outer surface of the side wall 46, as shown in FIG. 8D. The base portions 232 of the retainer elements 132 have diameters that are about equal to or slightly larger than the diameters of their corresponding retainer apertures 230, which helps ensure a snug or tight fit.

When the side wall portions 46 snap onto the retainer elements 132, the retainer apertures 230 return to their normal, non-stretched or non-deflected configuration. In this condition, an interference fit is formed between the head portions 234 and the retainer apertures 230, thus helping to prevent the cover 40 from detaching from the retainer elements 132 and the reaction plate 120. In the illustrated embodiment, the hooks 236 are configured to face away from the flap portion 42 in a direction generally opposite the direction in which the air bag 22 is deployed. Those skilled in the art will appreciate that the hooks 236 could be configured to face in alternative directions. The configuration and orientation of the hooks 236 may be selected to counteract deployment forces urging the side walls 46 of the cover 40 to disengage from the hooks and thereby detach the cover 40 from the air bag module 20.

The cover 40, when installed on the reaction plate 120 as described above, forms an assemblage 240 that includes the air bag 22, inflator 24, cover 40, reaction plate 120, and retainer 160. The assemblage 240 is maneuvered onto the base plate 80 such that the shank portions 174 of the studs 172 extend through the fastener receiving apertures 102 of the base plate. Washers 210 (FIGS. 7A and 7B) may be placed over the shank portions 174 protruding through the base plate and shoulder nuts 220 are installed (i.e., screwed) on the studs 172. As shown in FIGS. 7A and 7B, the shoulder nuts 220 include a head portion 222 and a cylindrical sleeve portion 224. The head portion 222 is configured to cooperate with a tool (not shown) to facilitate installation of the shoulder nut 220. For example, the head portion 222 may have a hexagonal configuration (see FIG. 3) for cooperating with a wrench in a known manner.

The sleeve portion 224 projects from a surface of the head portion 222 that defines an annular shoulder portion 226 of the shoulder nut 220. The shoulder portion 226 engages the washer 210, urging the washer against a lower surface 104 of the base plate 80 adjacent the fastener receiving apertures 102. A terminal end of the sleeve portion 224 engages a washer 212 installed on the studs 172 and positioned against a lower surface 148 of the reaction plate 120. The shoulder nuts 220, when installed as shown in FIG. 7A, secure the assemblage 240 to the base plate 80 and thus help maintain the airbag module 20 in the assembled condition.

As another feature of the present invention, referring to FIGS. 7A and 7B, the shoulder nuts 220 allow the assemblage 240 of the air bag 14, inflator 24, cover 40, reaction plate 120, and retainer 160 to move relative to the base plate 80 against the bias of the springs 110. The sleeve portions 224 of the shoulder nuts 220 extend through the fastener receiving apertures 102 of the base plate 80 and have an axial length greater than the thickness of the base plate. The fastener receiving apertures 102 form a clearance 242 with the sleeve portions 224 that permits the base plate 80 to slide over the sleeve portions 224. The base plate 80 and the assemblage 240 may thus move relative to each other.

The springs 110 bias the base plate 80 and reaction plate 120 away from each other toward the condition shown in FIG. 7A. The assemblage 240 is thus supported by the springs 110 for movement relative to the base plate 80 against the spring bias from the position shown in FIG. 7A to the position shown in FIG. 7B.

The air bag module 20 comprises a horn switch 260. In the illustrated embodiment, the horn switch 260 includes four switch actuators 262, one located at or near each of the four corner portions of the base plate 80 and reaction plate 120. Referring to FIGS. 7A and 7B, each switch actuator 262 comprises a switch portion 96 of the horn circuit 94, a switch receiving structure 86 defining the switch space 92 for housing the switch portion, and a corresponding spring 110, spring receiving structure 150, and switch actuator member 154.

To actuate the horn switch 260, the reaction plate 120 is moved toward the base plate 80 against the spring bias of the springs 110. This may be done, for example, by exerting a force (e.g., pressing on) the air bag cover 40. When such a force is applied, at least one of the switch actuator members 154 moves into the switch space 92 toward the corresponding switch portion 96 of the horn circuit 94. The switch actuator member 154 moves into contact with the switch portion 96 and actuates the horn switch 260, which closes an electrical contact that energizes a vehicle horn (not shown). In the illustrated embodiment, the switch portion 96 comprises a membrane switch that the switch actuator member 154 deforms to close the electrical contact.

In the illustrated embodiment, the assemblage 240 "floats" on the springs 110 and thus may be tilted relative to the base plate 80 to the extent permitted by the clearance between the fastener receiving apertures 102 on the base plate and the shoulder nuts 220. The clearance 242 may, for example, be sized so as to permit the assemblage 240 to tilt to a degree sufficient to allow for the actuation of the switch portions 96 individually depending on the location on the cover 40 at which an actuation force is applied. For example, an actuation force applied at a corner portion of the air bag cover 40 may actuate only the switch actuator 262 that corresponds with that particular corner portion of the cover.

Figure 9:
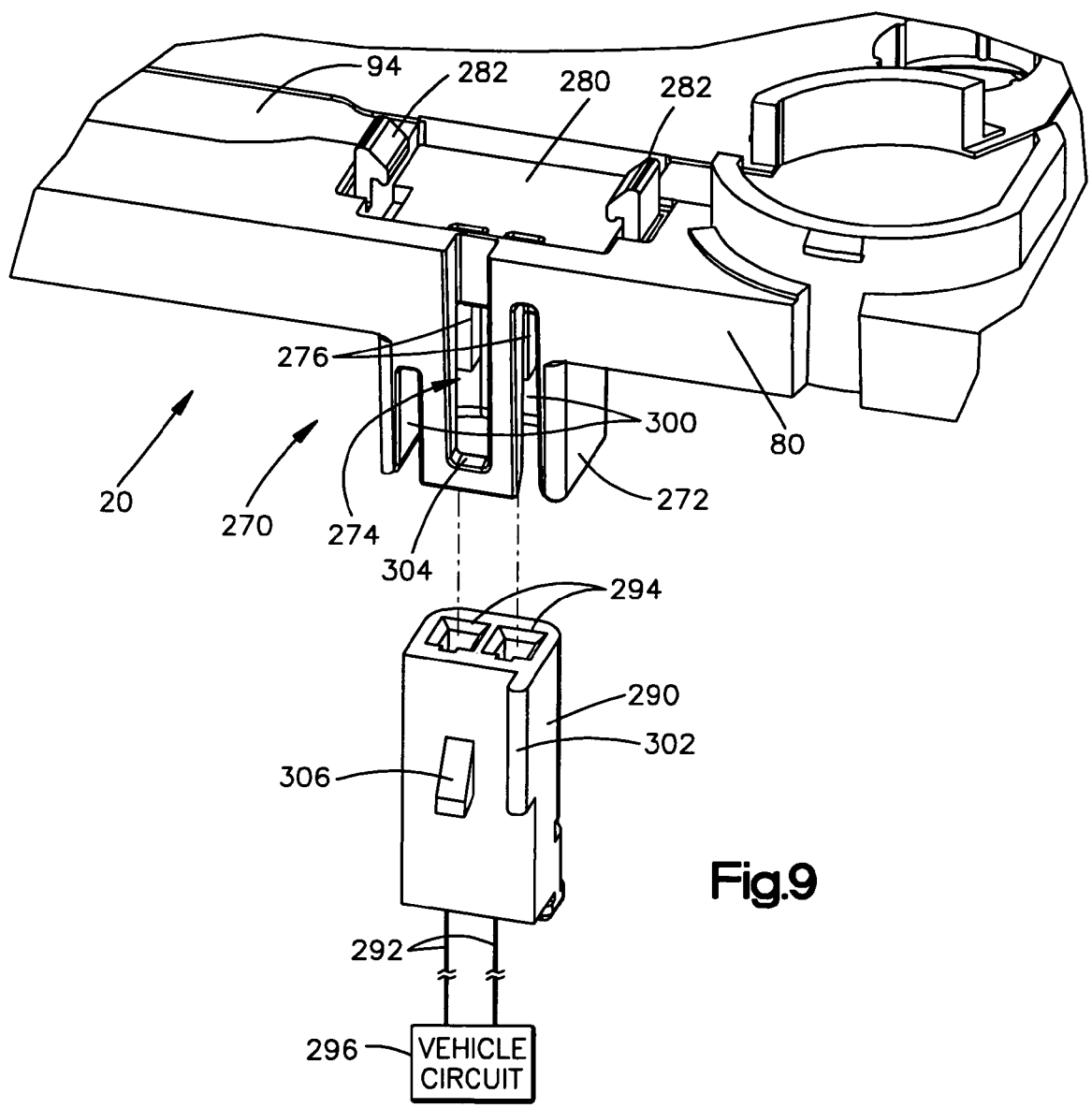
FIG. 9 is a magnified perspective view of a portion of the air bag module of FIG. 2.

Referring to FIG. 9, as a further feature of the present invention, the air bag module 20 includes a horn circuit connector portion 270 that is formed integrally with the base plate 80. In the embodiment illustrated in FIG. 9, the connector portion 270 is molded integrally with the base plate 80. The base plate 80 and connector portion 270 are thus formed as a single homogeneous piece of material, such as a single piece of molded polymer material.

As shown in FIG. 9, the connector portion 270 comprises a side wall 272 that projects transversely (e.g., perpendicularly) from the base plate 80. The side wall 272 helps define a space 274 in which one or more electrical connector pins 276 are disposed. The pins 276 are mounted on a portion 280 of the horn circuit 94, such as a printed circuit board, by known means, such as soldering. When the horn circuit 94 is mounted to the base plate 80, the pins 276 are positioned extending into the space 274. The base plate 80 may include means 282, such as hooks or clips, that help secure the portion 280 of the horn circuit 94 to the base plate 80. The means 282 may be molded integrally with the base plate 80 or formed separately from the base plate and secured to the base plate during assembly of the air bag module 20.

The connector portion 270 is adapted to receive a mating connector member 290 that is electrically connected to one or more vehicle mounted circuits 296 or devices, such as a vehicle horn, via lead wires 292. The connector portion 270 is configured to receive the connector member 290 in the space 274. The connector member 290 includes pin receiving apertures 294 in which the pins 276 are received to establish the electrical connection between the horn circuit 94 and the vehicle circuit 296.

The connector portion 270 may include guide features 300, such as a slot, for receiving a corresponding projection 302 on the connector member 290 to help ensure that the parts are fitted together in the correct orientation. The connector portion 270 may also include securing features 304, such as an aperture, for receiving a member 306, such as a hook or latch member, to interlock the connector portion and the connector member 290 and thus help prevent the connector member from becoming dislodged from the connector portion. The air bag module 20 may thus be configured such that the connector portion 270 and the connector member 290 are interconnected automatically when the air bag module 20 is installed on the steering wheel 30.

From the above description of the invention, those skilled in the art will perceive improvements, changes and modifications in the invention. Such improvements, changes and modifications within the skill of the art are intended to be covered by the appended claims.

We claim:

1. An apparatus for helping to protect an occupant of a vehicle, the apparatus comprising:
    an inflatable vehicle occupant protection device inflatable between a steering wheel of the vehicle and the vehicle occupant;
    a housing for helping to support the protection device on the steering wheel; and
    a cover for helping to conceal the protection device in a stored condition on the steering wheel;
    the housing comprising a retainer element extending from a side wall of the housing, the retainer element comprising a base portion and a head portion;
    the cover comprising a retainer aperture through which the head portion is extendable to help secure the cover to the housing, the head portion having a dimension that is greater than a diameter of the retainer aperture, the cover being configured to deform elastically to enlarge the retainer aperture to fit over the head portion and thereafter return to its non-deformed condition to form an interference that helps retain the cover on the retainer element.

2. The apparatus recited in claim 1, wherein the head portion has a generally oblong configuration with a length that extends along a major axis of the head portion, the retainer aperture having a generally circular configuration with a diameter smaller than the length of the head portion, the retainer aperture deforming when the cover deforms to permit the head portion to pass through the retainer aperture.

3. The apparatus recited in claim 1, wherein the base portion of the retainer element has a cylindrical configuration with a diameter greater than or about equal to the diameter of the retainer aperture, the base portion projecting perpendicularly from the side wall of the reaction plate, the head portion having a major axis that extends perpendicular to the base portion.

4. The apparatus recited in claim 1, wherein the base portion and head portion of the retainer element define a hook configured to counteract deployment forces that tend to disengage the cover from the housing.

5. The apparatus recited in claim 4, wherein the hook is configured to face opposite a deployment direction of the protection device.

6. The apparatus recited in claim 1, wherein the housing comprises a base plate connectable with the vehicle steering wheel and a reaction plate to which the protection device is secured, the apparatus further comprising a threaded fastener for connecting the base plate with the reaction plate, the threaded fastener having an outer surface over which one of the base plate and reaction plate may move to thereby permit relative movement between the base plate and reaction plate.

7. The apparatus recited in claim 6, wherein the threaded fastener comprises a shoulder nut.

8. The apparatus recited in claim 6, further comprising a stud that extends through aligned fastener receiving apertures in the reaction plate and the base plate, the threaded fastener being connectable with the stud to help secure the reaction plate to the base plate, the reaction plate being clamped between the stud and a terminal end surface of a sleeve portion of the threaded fastener, the base plate being movable over an outer surface of the sleeve portion to permit relative movement between the sleeve portion and the base plate.

9. The apparatus recited in claim 6, further comprising a spring member that biases the base plate and reaction plate away from each other.

10. The apparatus recited in claim 1, wherein the housing comprises a base plate connectable with the vehicle steering wheel and a horn circuit supported on the base plate, the base plate having a one piece molded construction and including a connector portion that defines a space in which one or more electrical connector pins of the horn circuit are disposed, the connector portion being configured to receive a mating connector member in the space to form an electrical connection between the horn circuit and a vehicle mounted circuit.

11. The apparatus recited in claim 10, wherein the connector portion and the connector member have portions configured to interlock with each other when the connector member is received in the connector portion.

12. An apparatus for helping to protect an occupant of a vehicle, the apparatus comprising:
    an inflatable vehicle occupant protection device inflatable between a steering wheel of the vehicle and the vehicle occupant;
    a base plate connectable with the vehicle steering wheel;
    a reaction plate to which the protection device is secured;
    a retainer for securing the protection device to the reaction plate;
    a stud that extends through aligned fastener receiving apertures in the base plate and reaction plate; and
    a shoulder nut connectable with the stud for connecting the base plate with the reaction plate, the shoulder nut comprising a sleeve portion that receives the stud and extends through the fastener receiving opening in the base plate, the retainer and reaction plate being clamped between a head portion of the stud and a terminal end portion of the sleeve portion, the base plate being retained on the sleeve portion by a shoulder portion of the shoulder nut and being movable over an outer surface of the sleeve portion to permit the reaction plate to move relative to the base plate, the apparatus further comprising:
    a cover for helping to conceal the protection device in a stored condition on the steering wheel; and
    a retainer element extending from a side wall of the reaction plate, the retainer element comprising a base portion and a head portion;
    the cover comprising a retainer aperture through which the head portion is extendable to help secure the cover to the housing, the head portion having a dimension that is greater than a diameter of the retainer aperture, the cover being configured to deform elastically to enlarge the retainer aperture to fit over the head portion and thereafter return to its non-deformed condition to form an interference that helps retain the cover on the retainer element.

13. The apparatus recited in claim 12, further comprising a spring member that biases the base plate and reaction plate away from each other.

14. The apparatus recited in claim 12, wherein the head portion has a generally oblong configuration with a length that extends along a major axis of the head portion, the retainer aperture having a generally circular configuration with a diameter smaller than the length of the head portion, the retainer aperture deforming when the cover deforms to permit the head portion to pass through the retainer aperture.

15. The apparatus recited in claim 12, further comprising a horn circuit supported on the base plate, the base plate having a one piece molded construction and including a connector portion that defines a space in which one or more electrical connector pins of the horn circuit are disposed, the connector portion being configured to receive a mating connector member in the space to form an electrical connection between the horn circuit and a vehicle mounted circuit.

16. The apparatus recited in claim 12, wherein the base portion and head portion of the retainer element define a hook configured to counteract deployment forces that tend to disengage the cover from the housing.

17. The apparatus recited in claim 16, wherein the hook is configured to face opposite a deployment direction of the protection device.

* * * * *